United States Patent
Mai et al.

(10) Patent No.: US 11,334,426 B2
(45) Date of Patent: May 17, 2022

(54) CRC ERROR ALERT SYNCHRONIZATION

(71) Applicant: MICRON TECHNOLOGY, INC., Boise, ID (US)

(72) Inventors: Thanh K. Mai, Allen, TX (US); Vijayakrishna J. Vankayala, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/853,479

(22) Filed: Apr. 20, 2020

(65) Prior Publication Data
US 2021/0326200 A1    Oct. 21, 2021

(51) Int. Cl.
*G06F 11/10* (2006.01)
*G06F 11/16* (2006.01)
*G06F 11/07* (2006.01)

(52) U.S. Cl.
CPC ........ *G06F 11/1004* (2013.01); *G06F 11/076* (2013.01); *G06F 11/0772* (2013.01); *G06F 11/1679* (2013.01)

(58) Field of Classification Search
CPC . G06F 11/1004; G06F 11/0772; G06F 11/076
USPC .............................................. 714/52
See application file for complete search history.

(56) References Cited

U.S. PATENT DOCUMENTS

| | | | |
|---|---|---|---|
| 11,271,773 B2 * | 3/2022 | Singh | H04L 41/147 |
| 2005/0188206 A1 * | 8/2005 | Kwok | H04L 9/3271 |
| | | | 713/176 |
| 2020/0052874 A1 * | 2/2020 | Itou | H04L 1/0061 |

* cited by examiner

*Primary Examiner* — Yair Leibovich
(74) *Attorney, Agent, or Firm* — Fletcher Yoder, P.C.

(57) ABSTRACT

A memory device includes cyclic redundancy check (CRC) circuitry configured to indicate whether an error has been detected in transmission of data from a host device to the memory device. The CRC circuitry includes a synchronous counter that is configured to synchronize a count with a system clock and to transmit the count. The CRC circuitry also includes pulse width control circuitry that is configured to receive the synchronized count from the synchronous counter and to generate pulse width controls based at least in part on the synchronized count. Furthermore, the CRC circuitry includes synchronization circuitry that is configured to receive the pulse width controls and to generate an error alert signal based at least in part on the pulse width controls.

19 Claims, 11 Drawing Sheets

CRC ERROR ALERT SYNCHRONIZATION

BACKGROUND

Field of the Present Disclosure

Embodiments of the present disclosure relate generally to the field of semiconductor devices. More specifically, embodiments of the present disclosure relate to synchronization of cyclic redundancy check (CRC) alerts in memory devices.

Description of Related Art

Memory devices may use write commands to write data to the memory devices. Typically, cyclical redundancy check (CRC) is a feature in dynamic random-access memory (DRAM) memory devices. CRC is an error-detecting code used to detect accidental changes to raw data. In other words, CRC may be able to detect changes to the data to be written in a write command during transmission. When there is a mismatch between the write data and the checksum bits provided by a host device/controller, an error (i.e., a CRC error) has occurred. In response to the CRC error, a memory device may drive an ALERT signal to a value (e.g., "0") for a number of clock cycles defined by a specification for the memory device. For example, the number of clock cycles may be between 12-20 clock cycles on a double-data rate type 5 (DDR5) dynamic random-access memory (DRAM) device and 6-10 clock cycles on a double-data rate type 4 (DDR4) DRAM device. Furthermore, a max duration of the ALERT signal hold to the value may be used to prevent the hold from being too long in the case of many back-to-back CRC errors. As a result, the memory device may skip driving the ALERT for some occurrences of the CRC error. However, the memory device and the host device should coordinate/predict when the memory device is to skip or drive the ALERT after a first CRC error. When the skipped/driven ALERTs are not coordinated or predicted properly, the design verification automation processes may be degraded, verification time is increased, and/or the general coordination between the host device and the memory device may be inhibited.

Embodiments of the present disclosure may be directed to one or more of the problems set forth above.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In some embodiments, CRC circuitry may be used to perform system-level parity error detection and/or CRC detection to determine when errors exist due to ambiguities occurring when clocks are merged and/or clock domains are crossed. CRC alert circuitry may be used to send an alert to a host device from a memory device when an error occurs. In some embodiments, the CRC alert circuitry may use an asynchronous ripple counter. For example, in slower clock speed specifications (e.g., DDR4), the asynchronous ripple counter may be sufficient. This is especially true when the memory device does not synchronize the CRC error with the internal clock of the memory device. A lack of synchronization of the CRC error and the internal clock may prevent a consistent prediction, especially with different process, voltage, and temperature (PVT) values. Accordingly, as discussed below, the CRC alert circuitry may include a high-clock frequency synchronous counter. For instance, a 4-bit synchronous counter may be used to meet an n clock cycles (e.g., with n being between 12-20 clock cycles for DDR5) timing of driving the CRC ALERT signal. Furthermore, the CRC circuitry may utilize relatively fast transistor logic gates to implement the high-speed counter. Furthermore, the CRC circuitry may synchronize the CRC error with an internal clock of the memory device to create a predictable and consistent block interval for skipping the CRC ALERT. By predicting accurately and consistently when the DRAM device will drive or skip the ALERT, the design verification automation process is enhanced and verification time is reduced.

Figure 1:
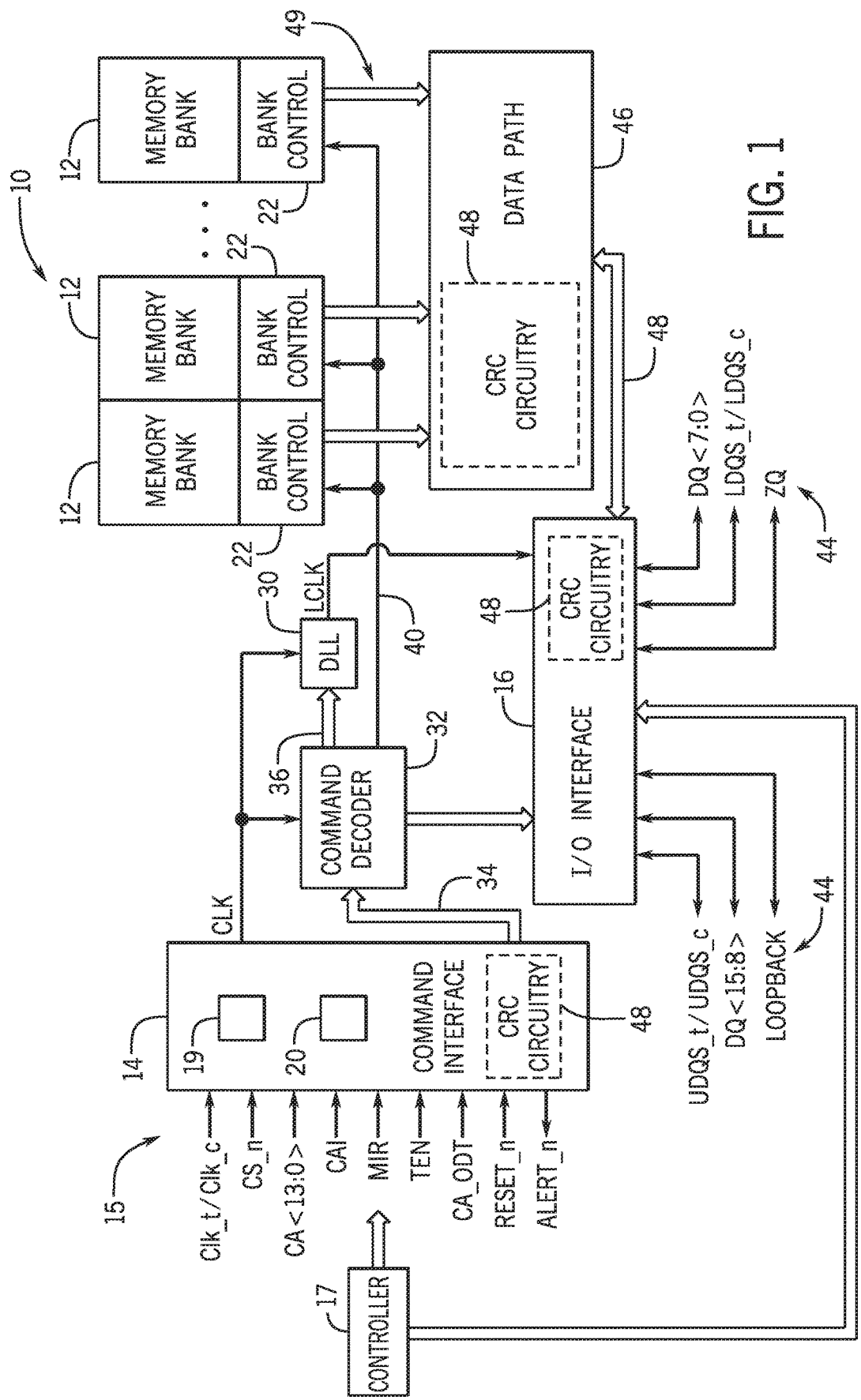
FIG. 1 is a simplified block diagram illustrating certain features of a memory device having cyclic redundancy check (CRC) circuitry, according to an embodiment of the present disclosure.

Turning now to the figures, FIG. 1 is a simplified block diagram illustrating certain features of a memory device 10. Specifically, the block diagram of FIG. 1 is a functional block diagram illustrating certain functionality of the memory device 10. In accordance with one embodiment, the memory device 10 may be a double data rate type 5 (DDR5) synchronous dynamic random-access memory (SDRAM) device. Various features of DDR5 SDRAM allow for reduced power consumption, more bandwidth and more storage capacity compared to prior generations of double data rate (DDR) SDRAM. However, some of the CRC alert discussion herein may be applicable to other memory devices, such as DDR type 4 (DDR4) SDRAM devices.

The memory device 10, may include a number of memory banks 12. The memory banks 12 may be DDR5 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., x8 or x16 memory chips), as will be appreciated. Each SDRAM memory chip may include one or more memory banks 12. The memory device 10 represents a portion of a single memory chip (e.g., SDRAM chip) having a number of memory banks 12. For DDR5, the memory banks 12 may be further arranged to form bank groups. For instance, for an 8 gigabyte (Gb) DDR5 SDRAM, the memory chip may include 16 memory banks 12, arranged into 8 bank groups, each bank group including 2 memory banks. For a 16 Gb DDR5 SDRAM, the memory chip may include 32 memory banks 12, arranged into 8 bank groups, each bank group including 4 memory banks, for instance. Various other configurations, organization and sizes of the memory banks 12 on the memory device 10 may be utilized depending on the application and design of the overall system.

The memory device 10 may include a command interface 14 and an input/output (I/O) interface 16. The command interface 14 is configured to provide a number of signals (e.g., signals 15) from an external device (not shown), such as a processor or controller. The processor or controller may provide various signals 15 to the memory device 10 to facilitate the transmission and receipt of data to be written to or read from the memory device 10.

As will be appreciated, the command interface 14 may include a number of circuits, such as a clock input circuit 18 and a command address input circuit 20, for instance, to ensure proper handling of the signals 15 from a host device 21. The host device 21 may include a processor and/or other device used to write data to and/or receive data from the memory device 10. For instance, the host device 21 may drive at least some operations of the memory device 10. The command interface 14 may receive one or more clock signals from an external device. Generally, double data rate (DDR) memory utilizes a differential pair of system clock signals, referred to herein as the true clock signal (Clk_t) and the bar clock signal (Clk_b). The positive clock edge for DDR refers to the point where the rising true clock signal Clk_t crosses the falling bar clock signal Clk_b, while the negative clock edge indicates that transition of the falling true clock signal Clk_t and the rising of the bar clock signal Clk_b. Commands (e.g., read command, write command, etc.) are typically entered on the positive edges of the clock signal and data is transmitted or received on both the positive and negative clock edges.

The clock input circuit 18 receives the true clock signal (Clk_t) and the bar clock signal (Clk_b) and generates an internal clock signal CLK. The internal clock signal CLK is supplied to an internal clock generator, such as a delay locked loop (DLL) circuit 30. The DLL circuit 30 generates a phase controlled internal clock signal LCLK based on the received internal clock signal CLK. The phase controlled internal clock signal LCLK is supplied to the I/O interface 16, for instance, and is used as a timing signal for determining an output timing of read data.

The internal clock signal(s)/phases CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the DLL circuit 30 over the bus 36 to coordinate generation of the phase controlled internal clock signal LCLK. The phase controlled internal clock signal LCLK may be used to clock data through the IO interface 16, for instance.

Further, the command decoder 32 may decode commands, such as read commands, write commands, mode-register set commands, activate commands, etc., and provide access to a particular memory bank 12 corresponding to the command, via the bus path 40. As will be appreciated, the memory device 10 may include various other decoders, such as row decoders and column decoders, to facilitate access to the memory banks 12. In one embodiment, each memory bank 12 includes a bank control block 22 which provides the necessary decoding (e.g., row decoder and column decoder), as well as other features, such as timing control and data control, to facilitate the execution of commands to and from the memory banks 12.

The memory device 10 executes operations, such as read commands and write commands, based on the command/address signals received from an external device, such as a processor. In one embodiment, the command/address bus may be a 14-bit bus to accommodate the command/address signals (CA<13:0>). The command/address signals are clocked to the command interface 14 using the clock signals (Clk_t and Clk_b). The command interface may include a command address input circuit 20 which is configured to receive and transmit the commands to provide access to the memory banks 12, through the command decoder 32, for instance. In addition, the command interface 14 may receive a chip select signal (CS_n). The CS_n signal enables the memory device 10 to process commands on the incoming CA<13:0> bus. Access to specific memory banks 12 within the memory device 10 is encoded on the CA<13:0> bus with the commands.

In addition, the command interface 14 may be configured to receive a number of other command signals. For instance, a command/address on die termination (CA_ODT) signal may be provided to facilitate proper impedance matching within the memory device 10. A reset command (RESET n) may be used to reset the command interface 14, status registers, state machines and the like, during power-up for instance. The command interface 14 may also receive a command/address invert (CAI) signal which may be provided to invert the state of command/address signals CA<13:0> on the command/address bus, for instance, depending on the command/address routing for the particular memory device 10. A mirror (MIR) signal may also be provided to facilitate a mirror function. The MIR signal may be used to multiplex signals so that they can be swapped for enabling certain routing of signals to the memory device 10, based on the configuration of multiple memory devices in a particular application. Various signals to facilitate testing of the memory device 10, such as the test enable (TEN) signal, may be provided, as well. For instance, the TEN signal may be used to place the memory device 10 into a test mode for connectivity testing.

The command interface 14 may also be used to provide an alert signal (ALERT_n) to the system processor or controller for certain errors that may be detected. For instance, an alert signal (ALERT_n) may be transmitted from the memory device 10 if a cyclic redundancy check (CRC) error is detected. Other alert signals may also be generated. Further, the bus and pin for transmitting the alert signal (ALERT_n) from the memory device 10 may be used as an input pin during certain operations, such as the connectivity test mode executed using the TEN signal, as described above.

As illustrated in FIG. 1, the I/O interface 16, the command decoder 32, and/or the data path 46 may include CRC circuitry 48 that may be used to evaluate received data to determine whether a transmission error is detected as a CRC error. The CRC circuitry 48 also may be used to drive the alert signal. For instance, the CRC circuitry 48 may be used to consistently predict CRC pulse drives and skips, even at different process, voltage, and temperature (PVT) values.

Data may be sent to and from the memory device 10, utilizing the command and clocking signals discussed above, by transmitting and receiving data signals 44 through the 10 interface 16. More specifically, the data may be sent to or retrieved from the memory banks 12 over the data path 46, which includes a plurality of bi-directional data buses. Data 10 signals, generally referred to as DQ signals, are generally transmitted and received in one or more bi-directional data busses. For certain memory devices, such as a DDR5 SDRAM memory device, the 10 signals may be divided into upper and lower bytes. For instance, for a x16 memory device, the 10 signals may be divided into upper and lower 10 signals (e.g., DQ<15:8> and DQ<7:0>) corresponding to upper and lower bytes of the data signals, for instance.

To allow for higher data rates within the memory device 10, certain memory devices, such as DDR memory devices may utilize data strobe signals, generally referred to as DQS signals. The DQS signals are driven by the external processor or controller sending the data (e.g., for a write command) or by the memory device 10 (e.g., for a read command). For read commands, the DQS signals are effectively additional data output (DQ) signals with a predetermined pattern. For write commands, the DQS signals are used as clock signals to capture the corresponding input data. As with the clock signals (Clk_t and Clk_b), the DQS signals may be provided as a differential pair of data strobe signals (DQS_t and DQS_b) to provide differential pair signaling during reads and writes. For certain memory devices, such as a DDR5 SDRAM memory device, the differential pairs of DQS signals may be divided into upper and lower data strobe signals (e.g., UDQS_t and UDQS_b; LDQS_t and LDQS_b) corresponding to upper and lower bytes of data sent to and from the memory device 10, for instance.

An impedance (ZQ) calibration signal may also be provided to the memory device 10 through the IO interface 16. The ZQ calibration signal may be provided to a reference pin and used to tune output drivers and ODT values by adjusting pull-up and pull-down resistors of the memory device 10 across changes in PVT values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/VSS external to the memory device 10. This resistor acts as a reference for adjusting internal ODT and drive strength of the IO pins.

In addition, a loopback signal (LOOPBACK) may be provided to the memory device 10 through the IO interface 16. The loopback signal may be used during a test or debugging phase to set the memory device 10 into a mode wherein signals are looped back through the memory device 10 through the same pin. For instance, the loopback signal may be used to set the memory device 10 to test the data output (DQ) of the memory device 10. Loopback may include both a data and a strobe or possibly just a data pin. This is generally intended to be used to monitor the data captured by the memory device 10 at the IO interface 16.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into the memory device 10. Accordingly, it should be understood that the block diagram of FIG. 1 is only provided to highlight certain functional features of the memory device 10 to aid in the subsequent detailed description.

Figure 2:
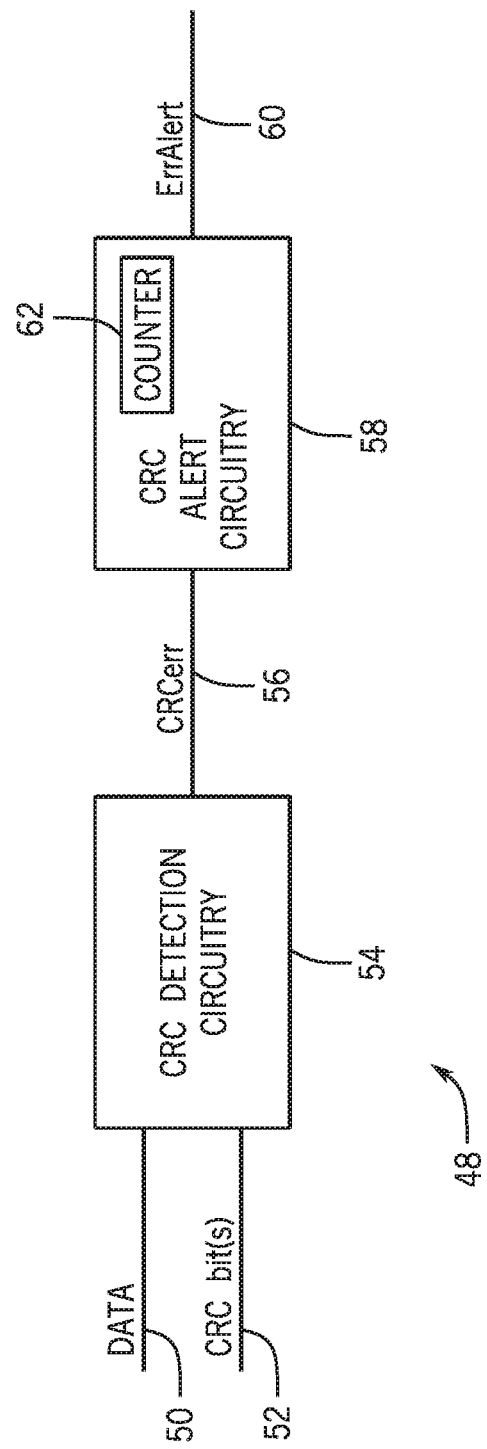
FIG. 2 is a block diagram of the CRC circuitry of the memory device of FIG. 1 having CRC detection circuitry and CRC alert circuitry, according to an embodiment of the present disclosure.

FIG. 2 is a simplified block diagram of the CRC circuitry 48 of FIG. 1. As illustrated, the CRC circuitry 48 receives a data signal 50 (e.g., DQ signals) and one or more CRC bit(s) 52 from the host device at CRC detection circuitry 54. The CRC detection circuitry 54 may also receive one or more additional signals, such as CRC enable mode register values, CRC settings, and the like. The CRC detection circuitry 54 uses the data signal 50 and the CRC bit(s) 52 to detect whether a CRC error has occurred. Accordingly, the CRC detection circuitry 54 outputs a CRC error (CRCerr) signal 56 indicative of whether a CRC error has been detected by the CRC detection circuitry 54.

CRC alert circuitry 58 receives the CRCerr signal 56 and outputs an alert (ErrAlert) signal 60 (e.g., ALERT_n) to the host device to indicate the detection of the CRC error. The CRC alert circuitry 58 may include a counter 62 used predict and/or control transmission of the ErrAlert signal 60. The counter 62 may be synchronized with a main clock (Clk_t) of the memory device 10 or may be delay-based and unsynchronized from the main clock. However, due to a specified pulse width of the CRCerr signal 56 specified in a specification (e.g., DDR4 or DDR5) and a lack of synchronization of CRC alerting to the main clock of the memory device 10, subsequent CRC errors may be unable to be sent and/or captured consistently in the CRC alert circuitry 58.

Figure 3:
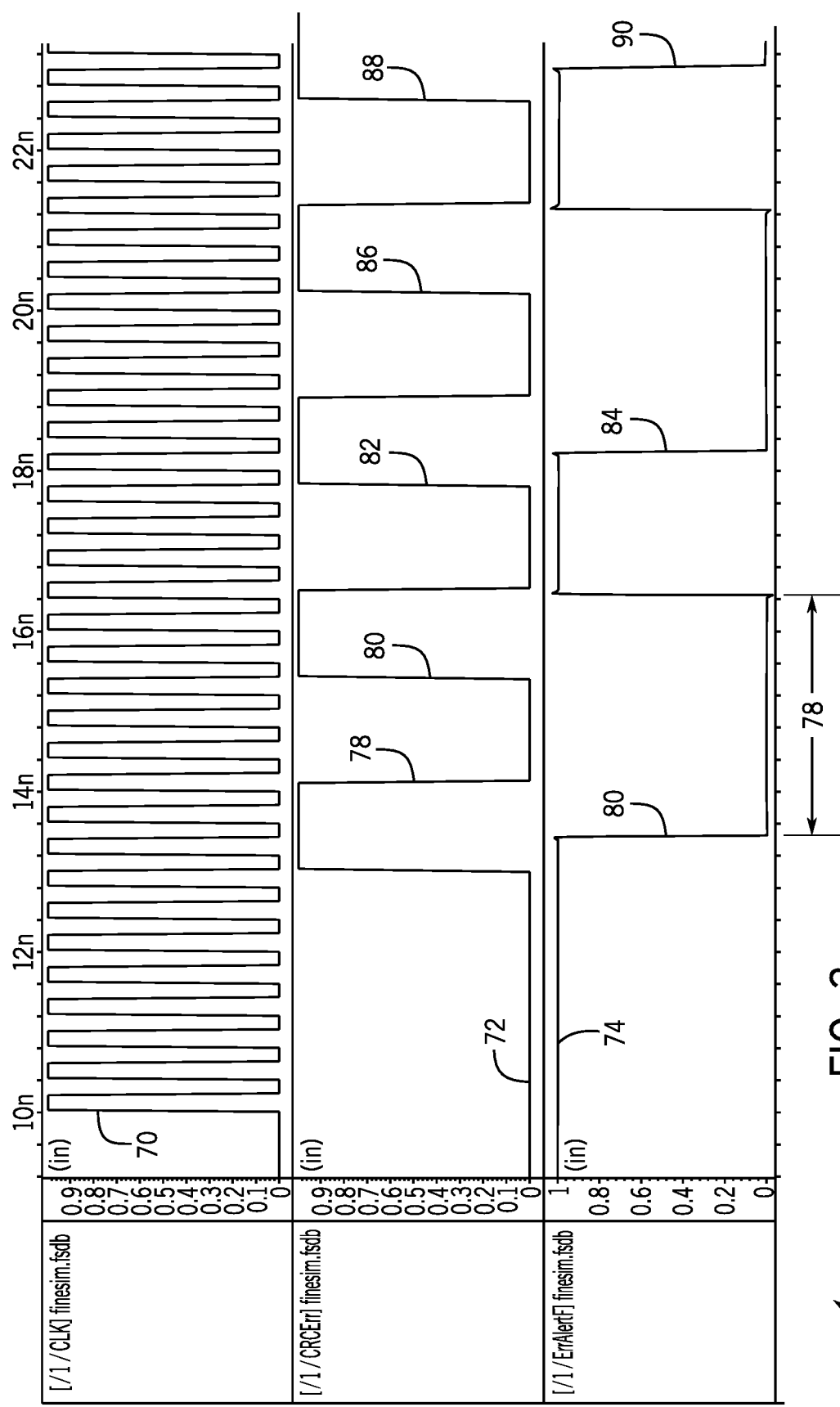
FIG. 3 is a graph showing CRC error detection signals and CRC alert signals using the CRC circuitry of FIG. 2, in accordance with an embodiment of the present disclosure.

For example, FIG. 3 illustrates a graph 68 using a non-synchronized counter 62 that results in a consistent result with every other error being skipped. The graph 68 includes a line 70 that represents the main clock of the memory device 10. The graph 68 also includes a line 72 that corresponds to the CRCerr signal 56 indicating when a CRC error has been detected in the CRC detection circuitry 54. The graph 68 further includes a line 74 that corresponds to the ErrAlert signal 60 that is configured to indicate to the host device that the CRC error has been detected. Using a non-synchronized counter 62, the CRCerr signal 56 and the ErrAlert signal 60 may be delay-based.

In the simulation performed to generate the graph 68, the CRCerr signal 56 occurs every n (e.g., 6) cycles of the line 70. In some specifications (e.g., DDR4 specification) for the memory device 10 may set a pulse width 76 to a number (e.g., 6-10) of cycles of the line 70. In the graph 68, every other pulse of the CRCerr signal 56 is used to transmit a pulse over the ErrAlert signal 60 while the other pulses are skipped. For instance, a pulse 78 of the CRCerr signal 56 is used to transmit a pulse 80 of the ErrAlert signal 60 having the pulse width 76. Since the ErrAlert signal 60 is still asserted when a pulse 82 of the CRCerr signal 56 is received, the pulse 82 is skipped. Similarly, a pulse 82 of the CRCerr signal 56 is used to transmit a pulse 84 of the ErrAlert signal 60 while a pulse 86 of the CRCerr signal 56 is skipped, and a pulse 88 of the CRCerr signal 56 is used to transmit pulse 90 of the ErrAlert signal 60. Thus, the output of the ErrAlert signal 60 is consistent and predictable about which errors are skipped and which are registered.

Figure 4:
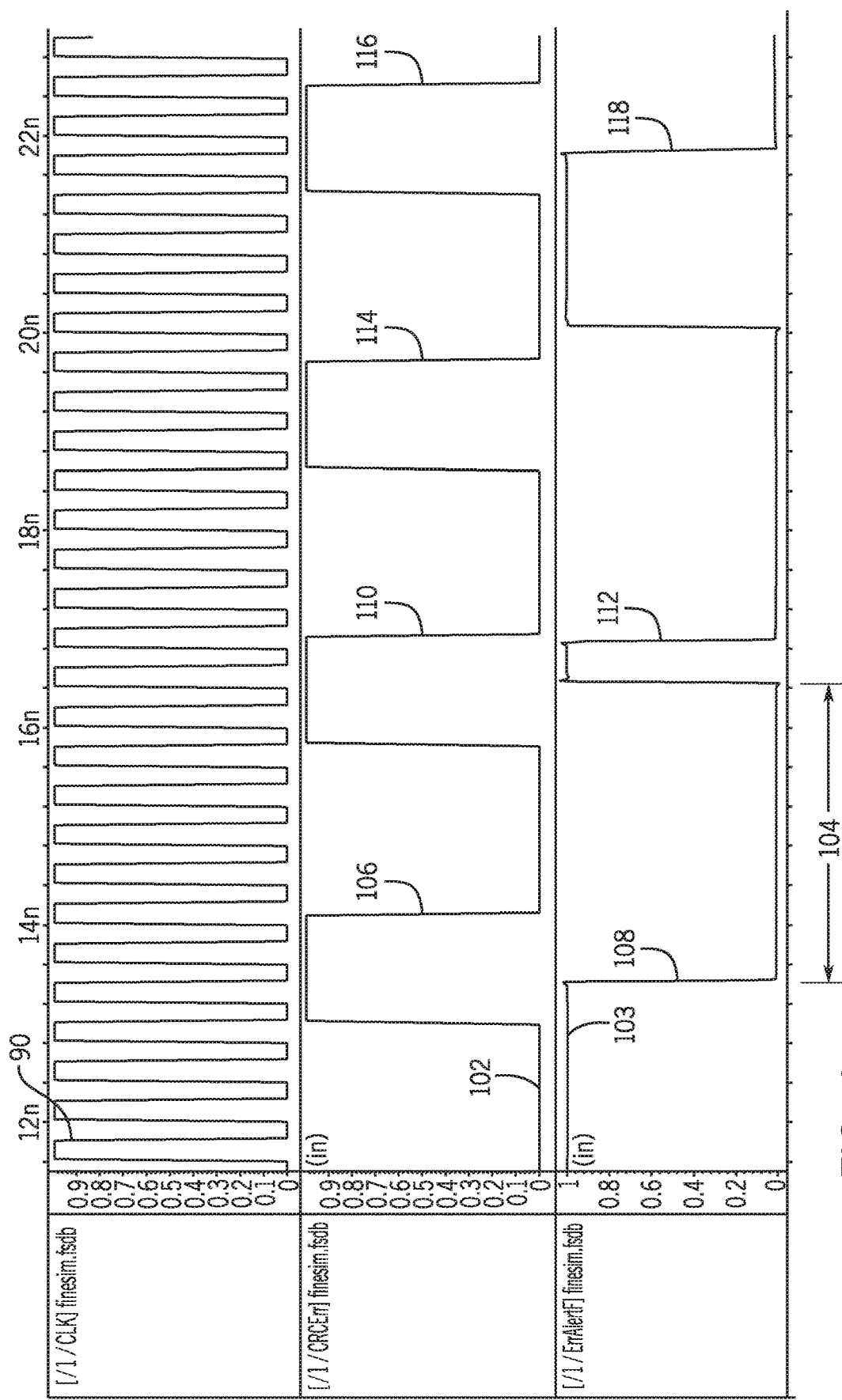
FIG. 4 is a graph showing CRC error detection signals and CRC alert signals using the CRC circuitry of FIG. 2, in accordance with an embodiment of the present disclosure.

FIG. 4 illustrates a graph 100 that uses the non-synchronized counter 62 that results in an inconsistent result. The graph 100 includes the line 70. Additionally, the graph 100 includes a line 102 that corresponds to the CRCerr signal 56 indicating when a CRC error has been detected in the CRC detection circuitry 54. The graph 100 further includes a line 103 that corresponds to the ErrAlert signal 60 that is configured to indicate to the host device that the CRC error has been detected.

In the simulation performed to generate the graph 100, the CRCerr signal 56 occurs every m (e.g., 7) cycles of the line 70. In some specifications (e.g., DDR4 specification) for the memory device 10 may set a pulse width 104 to a number (e.g., 6-10) of cycles of the line 70. In the graph 100, a pulse 106 of the CRCerr signal 56 is used to transmit a pulse 108 of the ErrAlert signal 60 having the pulse width 104. A next pulse 110 of the CRCerr signal 56 is used to transmit a pulse 112 of the ErrAlert signal 60. Since the ErrAlert signal 60 is still asserted when a pulse 114 of the CRCerr signal 56 is received, the pulse 114 is skipped. However, a pulse 116 of the CRCerr signal 56 is used to transmit a pulse 118 of the ErrAlert signal 60. Thus, the output of the ErrAlert signal 60 is inconsistent and unpredictable about which errors are skipped and which are registered with pulses 106, 110, and 116 registered while the pulse 114 is skipped.

Figure 5:
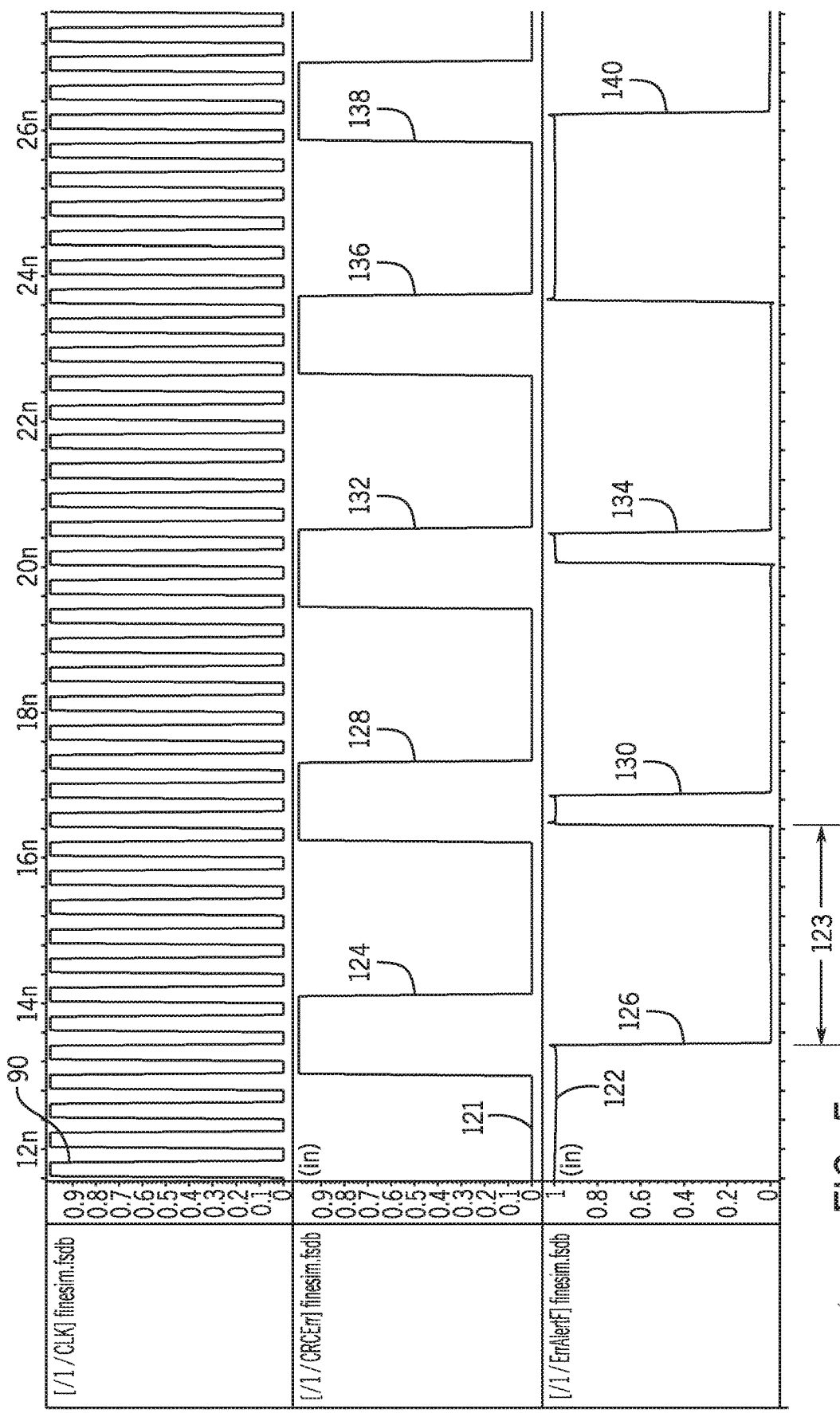
FIG. 5 is a graph showing CRC error detection signals and CRC alert signals using the CRC circuitry of FIG. 2, in accordance with an embodiment of the present disclosure.

FIG. 5 illustrates a graph 120 that uses the non-synchronized counter 62 that results in an inconsistent result. The graph 120 includes the line 70. Additionally, the graph 120 includes a line 121 that corresponds to the CRCerr signal 56 indicating when a CRC error has been detected in the CRC detection circuitry 54. The graph 120 further includes a line 122 that corresponds to the ErrAlert signal 60 that is configured to indicate to the host device that the CRC error has been detected.

In the simulation performed to generate the graph 120, the CRCerr signal 56 occurs every m (e.g., 8) cycles of the line 70. In some specifications (e.g., DDR4 specification) for the memory device 10 may set a pulse width 123 to a number (e.g., 6-10) of cycles of the line 70. In the graph 120, a pulse 124 of the CRCerr signal 56 is used to transmit a pulse 126 of the ErrAlert signal 60 having the pulse width 123. A next pulse 128 of the CRCerr signal 56 is used to transmit a pulse 130 of the ErrAlert signal 60, and a pulse 132 of the CRCerr signal 56 is used to transmit a pulse 134 of the ErrAlert signal 60. Since the ErrAlert signal 60 is still asserted when a pulse 136 of the CRCerr signal 56 is received, the pulse 136 is skipped. However, a pulse 138 of the CRCerr signal 56 is used to transmit a pulse 140 of the ErrAlert signal 60. Thus, the output of the ErrAlert signal 60 is inconsistent and unpredictable about which errors are skipped and which are registered with pulses 124, 128, 132, and 138 registered while the pulse 136 is skipped.

Figure 6:
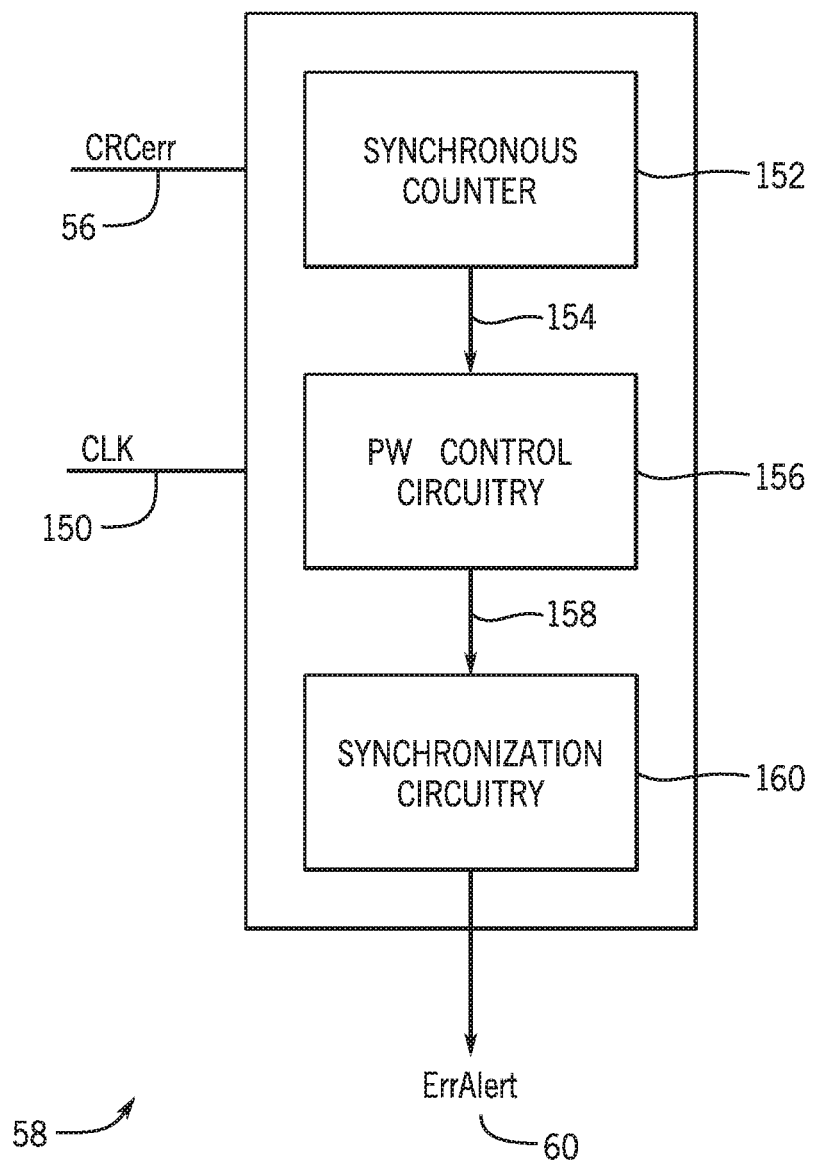
FIG. 6 is a block diagram of the CRC circuitry of FIG. 1 having a synchronous counter, a pulse width (pw) control circuitry, and synchronization circuitry configured to synchronize CRC alerting to a main clock of the memory device, in accordance with an embodiment of the present disclosure.

One way to increase consistency in operation of the CRC circuitry 48 includes using a synchronous counter that synchronizes counting with a main clock that controls a pulse width of the ErrAlert signal 60. For instance, FIG. 6 illustrates a block diagram of the CRC alert circuitry 58 that uses a main clock (CLK) 150 (e.g., clk_t in FIG. 1) with a synchronous counter 152 to that generates a count 154 synchronized with the CLK 150. PW control circuitry 156 is used to set a pulse width controls 158 for the ErrAlert signal 60. Synchronization circuitry 160 synchronizes the CRCerr signal 56 with the CLK 150 and outputs the ErrAlert signal 60 using the pulse width controls 158.

Figure 7:
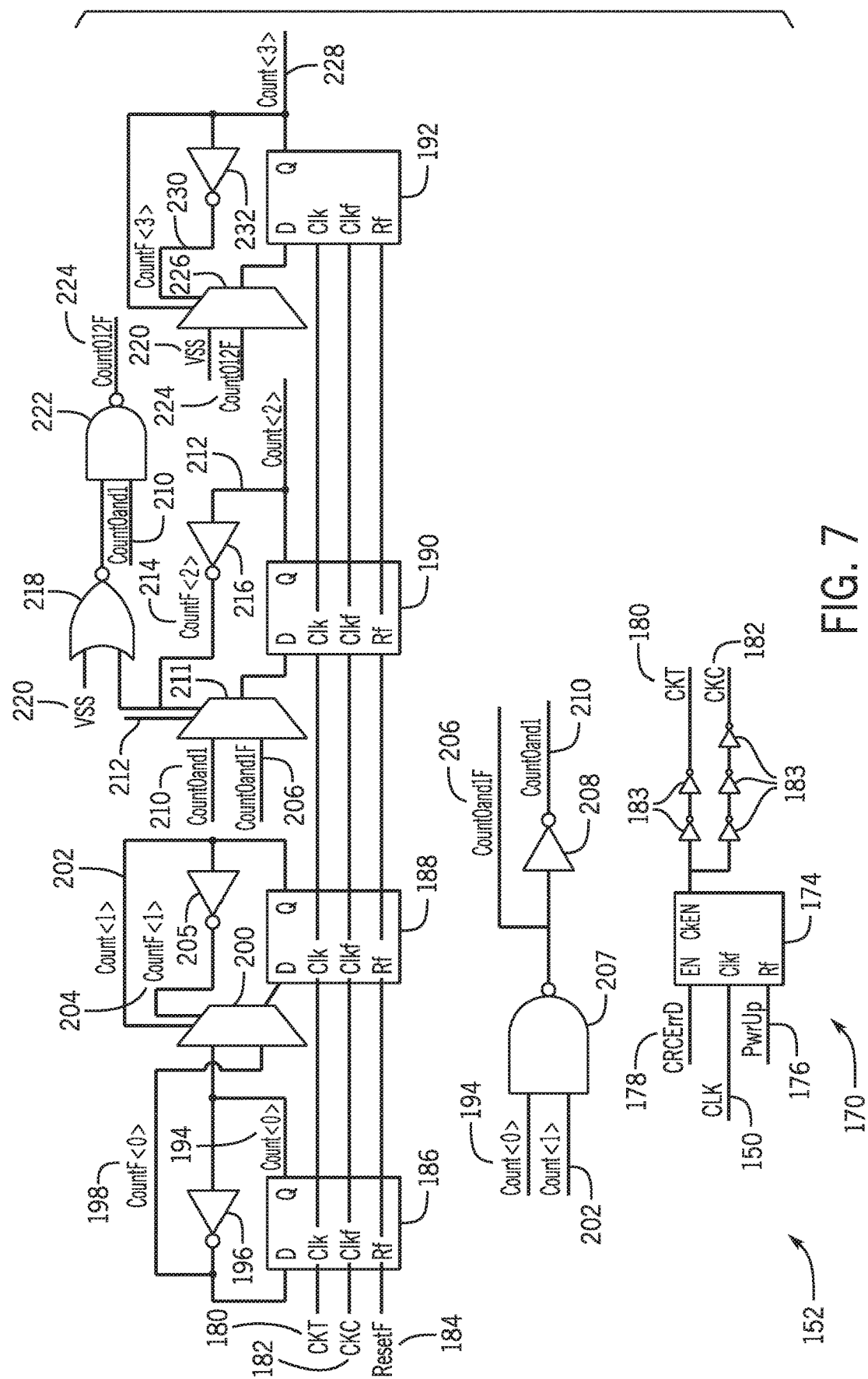
FIG. 7 is a circuit diagram of the synchronous counter of FIG. 6, in accordance with an embodiment of the present disclosure.

FIG. 7 is a schematic diagram of an embodiment of the synchronous counter 152. As illustrated, the synchronous counter 152 includes clock circuitry 170 that receives the CLK 150 at clock pin of a flip-flop 174. The flip-flop 174 also receives a CRC enable signal (CRCErrD) 178 that enables or disables CRC functionality. The flip-flop 174 also uses a power up (PwrUp) signal 176 to reset the flip-flop 174 after a power cycle of the memory device 10. Based on the CRCErrD 178 and the CLK 150, the flip-flop 174 outputs a local clock true (CKT) 180 and/or a local clock complement (CKC) 182 using one or more inverter/amplifiers 183. By using the flip-flop 174, the CKT 180 and CKC 182 are only output when CRC is enabled reducing power consumption of the CRC circuitry 148 when CRC is not enabled for the memory device 10.

The synchronous counter 152 uses the CKT 180 and the CKC 182 to control latching of flip-flops 186, 188, 190, and 192 used to implement the synchronous counter 152 as a four-bit counter synchronized the CLK 150 via the CKT 180 and the CKC 182. However, in some embodiments, the synchronous counter 152 may include any suitable number of bits and corresponding flip-flops. The flip-flops 186, 188, 190, and 192 may also use a reset signal (ResetF signal) 184 to reset counting. In some embodiments, the ResetF signal 184 may be generated in the PW control circuitry 156.

In the synchronous counter 152, an output (Count<0>) 194 of the flip-flop 186 is inverted using an inverter 196 to generate CountF<0> 198 that is fed back into the flip-flop 186 to invert the Count<0> 194 at a next clock cycle. The Count<0> 194 and the CountF<0> 198 are transmitted to a multiplexer 200 that selectively passes the Count<0> 194 or the CountF<0> 198 as an input to the flip-flop 188. An output Count<1> 202 is used generate a CountF<1> 204 inverted using inverter 205. The multiplexer 200 is controlled using the Count<1> 202 and/or the CountF<1> 204.

The synchronous counter 152 also transmits the Count<0> 194 and the Count<1> 202 to a NAND gate 207 to generate a Count0and1F signal 206. The Count0and1F signal 206 is transmitted to an inverter 208 to generate a Count0and1 signal 210.

A multiplexer 211 receives the Count0and1F signal 206 and the Count0and1 signal 210 and transmits an output to the flip-flop 190. An output Count<2> 212 is output from the flip-flop 190 based on the output from the multiplexer 211. The Count<2> 212 is used to generate a CountF<2> 214 using an inverter 216. The output of the multiplexer 211 is controlled using the Count<2> 212 and/or the CountF<2> 214.

The CountF<2> 214 is also transmitted to a NOR gate 218 that also receives a voltage (VSS) 220 (e.g., 0 V). An output of the NOR gate 218 is transmitted to a NAND gate 222 along with the Count0and1 signal 210 to generate a Count012F signal 224. The Count012F signal 224 and the voltage 220 are also transmitted to a multiplexer 226 used to generate an input to the flip-flop 192. An output Count<3> 228 and complementary CountF<3> 230 are used to control the output of the multiplexer 226. An inverter 232 may be used to generate the CountF<3> 230 from the Count<3> 228. The Count<3> 228, the Count<2> 212, the CountF<2> 214, the Count<1> 202, the CountF<1> 204, the Count<0> 194, and the CountF<0> 198 may be the component portions of the count 154 passed from the synchronous counter 152 to the PW control circuitry 156.

Figure 8:
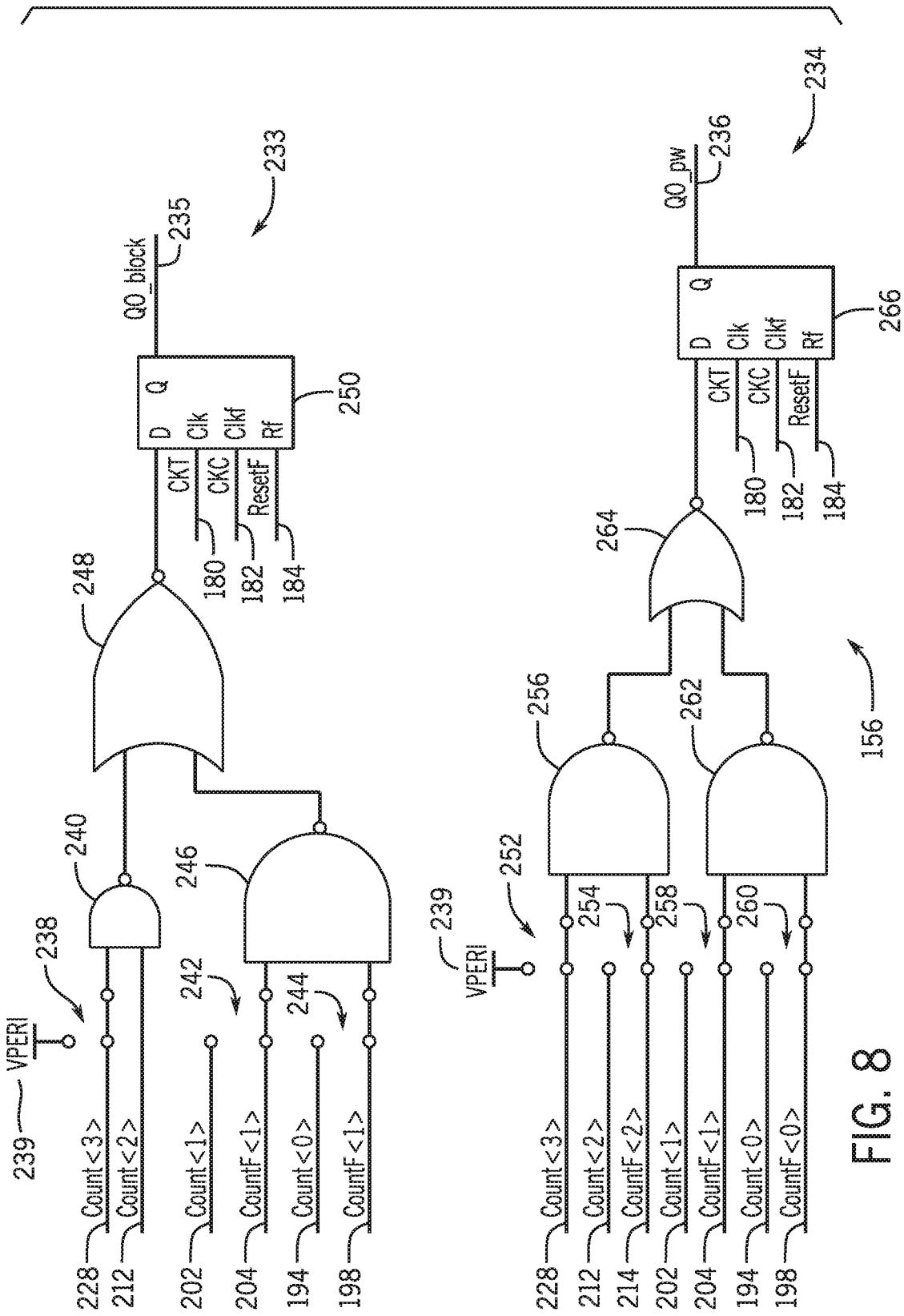
FIG. 8 is a circuit diagram of the pw control circuitry of FIG. 6, in accordance with an embodiment of the present disclosure.

As previously discussed, the PW control circuitry 156 uses the count 154 to set the pulse width controls 158 of the ErrAlert signal 60. FIG. 8 is a schematic diagram of an embodiment of the PW control circuitry 156. The PW control circuitry 156 includes block circuitry 233 that is configured to generate a Q0_block signal 235 and includes pulse width circuitry 234 that is configured to generate a Q0_pw signal 236.

The block circuitry 233 receives the Count<3> 228, the Count<2> 212, the Count<1> 202, the CountF<1> 204, the Count<0> 194, and the CountF<0> 198. A switch 238 is used to select between transmitting the Count<3> 228 and a voltage (VPERI) 239 (e.g., logic high) to a NAND gate 240 along with the Count<2> 212. Similarly, a switch 242 is used to select between transmitting the Count<1> 202 and the CountF<1> 204, and a switch 244 is used to select between transmitting the Count<0> 194 and the CountF<0> 198. The switches 242 and 244 are configured to control which inputs are transmitted to a NAND gate 246. Outputs of the NAND gates 240 and 246 are combined using a NOR gate 248. An output of the NOR gate 248 is transmitted to a flip-flop 250 that uses the CKT 180 and the CKC 182 to gate latching of the output of the NOR gate 248 while using the ResetF signal 184 to control resetting of the flip-flop 250. The flip-flop 250 outputs the Q0_block signal 235.

The pulse width circuitry 234 receives the Count<3> 228, the Count<2> 212, the CountF<2> 214, the Count<1> 202, the CountF<1> 204, the Count<0> 194, and the CountF<0> 198. A switch 252 is configured to select between the voltage 239 and the Count<3> 228, and a switch 254 is configured to select between the Count<2> 212 and the CountF<2> 214. The outputs of the switches 252 and the switch 254 are transmitted to a NAND gate 256. Similarly, a switch 258 is used to select between transmitting the Count<1> 202 and the CountF<1> 204, and a switch 260 is used to select between transmitting the Count<0> 194 and the CountF<0> 198. The switches 258 and 260 are configured to control which inputs are transmitted to a NAND gate 262. Outputs of the NAND gates 256 and 262 are combined using a NOR gate 264. An output of the NOR gate 264 is transmitted to a flip-flop 266 that uses the CKT 180 and the CKC 182 to gate latching of the output of the NOR gate 264 while using the ResetF signal 184 to control resetting of the flip-flop 266. The flip-flop 266 outputs the Q0_pw signal 236. The Q0_block signal 235 counts more clock cycles than the Q0_pw signal 236. This additional counting ensures that blocking new CRC errors using the Q0_block signal 235 lasts longer than a duration of a pulse width set using the Q0_pw signal 235 to ensure a glitch-free operation. Thus, any new CRC error will be blocked while a CRC error alert pulse is in progress, which is key in accurately predicting when a next CRC error is going to be recognized.

Figure 9:
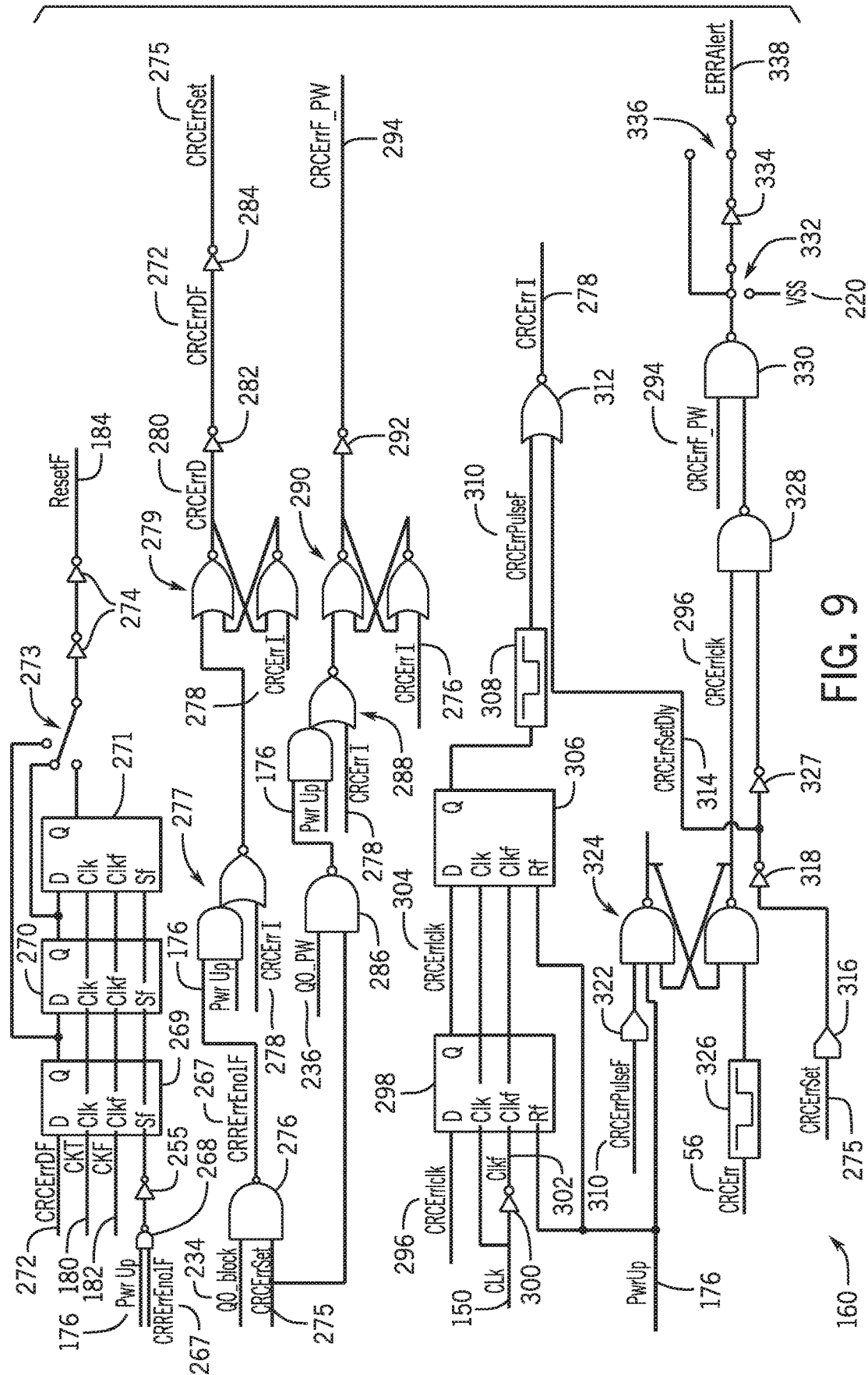
FIG. 9 is a circuit diagram of the synchronization circuitry of FIG. 6, in accordance with an embodiment of the present disclosure.

FIG. 9 is a schematic diagram of the synchronization circuitry 160. The synchronization circuitry 160 receives a CRCErrEndF 267 that is used to disable the synchronous counter 152 at the end of the CRC detection and alerting process. A NAND gate 268 receives the CRCErrEndF 267 and the PwrUp signal 176. An output of the NAND gate 268 is transmitted to an inverter 255 that then is transmitted to respective set pins of flip-flops 269, 270, and 271. The flip-flop 269 receives a CRCErrDF 272. The CRCErrDF 272 is a synchronized timing signal to the CKT 180 and the CKC 182. The CRCErrDF 272 is latched into the flip-flop 269 using the CKT 180 and the CKC 182. When latched, the CRCErrDF 272 after cycle delay as CRCErrD1F is output to the flip-flop 270. Similarly, the CRCErrD1F is latched into the flip-flop 270 and after another cycle delay is output as CRCErrD2F to the flip-flop 271. Similarly, the CRCErrD2F is latched into the flip-flop 271 and after another cycle delay is output as CRCErrD3F to a switch 273. The CRCErrD1F, the CRCErrD2F, and the CRCErrD3F are transmitted to the switch 273 that is used to select between the CRCErrD1F, the CRCErrD2F, and the CRCErrD3F. The selected timing signal with an appropriate amount of delay is used as the ResetF signal 184 to reset/enable/disable the synchronization counter 152 as noted above in relation to FIG. 7. In some embodiments, the ResetF signal 184 is amplified and/or inverted using inverters 274.

The synchronization circuitry 160 also receives the Q0_block signal 234 and a CRCErrSet 275 at a NAND gate 276. The CRCErrSet 275 is used to ignore any new CRC error while the ErrAlert signal 60 is active. The CRCErrSet 275 may be reset by the Q0_pw signal 236. A NAND operation on the Q0_block signal 234 and the CRCErrSet 275 in the NAND gate 276 generates the CRCErrEndF 267 used in the NAND gate 268. The CRCErrEndF 267 and the PwrUp signal 176 are transmitted to a multiplexer 277 along with a CRCErrI 278. The CRCErrI 278 is used to start the synchronous counter 152 and the CRC alerting process by enabling the synchronous counter 152 and counting the clock cycles for the ErrAlert signal 60. An output of the multiplexer 277 is passed to a set pin of a SR flip-flop 279. A reset pin of the SR flip-flop 279 is connected to the CRCErrI 278. An output of the SR flip-flop 279 is CRCErrD 280 as a CRC error disable signal. The CRCErrD 280 is transmitted to an inverter 282 to generate the CRCErrDF 272. The CRCErrDF 272 is transmitted to an inverter 284 to generate the CRCErrSet 275. The CRCErrSet 275 is used to ignore any new CRC error while the ErrAlert signal 60 is in progress. Using the above circuitry, the CRCErrSet 275 is set by the CRCErrI 278 and is reset by the Q0_block 235.

The synchronization circuitry 160 also includes a NAND gate 286 that receives the Q0_pw signal 236 and the CRCErrSet 275. The CRCErrSet 275 and the PwrUP signal 176 are transmitted to a multiplexer 288 along with a CRCErrI 278. An output of the multiplexer 288 is passed to a set pin of a SR flip-flop 290. A reset pin of the SR flip-flop 290 is connected to the CRCErrI 278. An output of the SR flip-flop 290 is transmitted to an inverter 292 that is configured to output CRCErrF_PW 294. The CRCErrF_PW 294 determines the pulse width of the ErrAlert signal 60. The CRCErrF_PW 294 is set by the CRCErrI 278 and is reset by the Q0_pw signal 236.

A CRCErr1clk 296 is transmitted to a flip-flop 298. As noted below, the CRCErr1clk 296 is created from the CRCerr signal 56 and has an at least 1 clock cycle wide pulse so that the CRCErr1clk 296 may be latched and synchronized to the CKT 180. The flip-flop 298 is latched using the CLK 150 (e.g., main clock of the memory device 10). The CLK 150 may also be inverted in an inverter 300 to generate a CLKf 302 used as a differential clock to aid in latching the CRCErr1clk 296 in the flip-flop 298. The flip-flop 298 outputs a CRCErr_1clkd 304 that is a delayed version of the CRCErr_1clk 296 delayed by a clock cycle of the CLK 150. The CRCErr_1clkd 304 is transmitted to a flip-flop 306 that is also latched using the CLK 150 and the CLKf 302. The flip-flops 298 and 306 may be reset using the PwrUp signal 176 when the memory device 10 is powered up. An output of the flip-flop 306 is transmitted to a pulse generator 308. For example, the pulse generator 308 may be a cell-type pulse generator. The pulse generator 308 outputs a CRCErrPulseF 310 that is an error signal synchronized to the CLK 150. The CRCErrPulseF 310 is transmitted to a NOR gate 312 to generate the CRCErrI 278. The NOR gate 312 also receives a CRCErrSetDly 314 that is a delayed version of the CRCErrSet 275 via a delay 316. In some embodiments, the CRCErrSet 275 may be inverted via one or more inverters 318 to generate the CRCErrSetDly 314.

A delayed version of the CRCErrPulseF 310 delayed using a delay 322 and the PwrUp signal 176 are transmitted to set pins of an SR flip-flop 324. A reset pin of the SR flip-flop 324 receives a pulse generated from a pulse generator 326 based at least in part on the CRCErr signal 56. The pulse generator 326 may include a cell-type pulse generator. An output of the SR flip-flop 324 is the CRCErr1clk 296. The CRCErr1clk 296 is transmitted to a NAND gate 328 along with an inversion of the CRCErrSetDly 314 that is inverted in an inverter 327. An output of the NAND gate 328 is transmitted to a NAND gate 330 that is NANDed together with the CRCErrF_PW 294. An output of the NAND gate 330 is transmitted to a switch 332 to select between the output of the NAND gate 330 and the voltage 220. The selected value in the switch 332 is transmitted to an inverter 334. The inverted value from the inverter 334 is transmitted to a switch 336 that is used to select whether or not to bypass the inverter 334 in generation of an ErrAlertF 338. The ErrAlertF 338 may be an inverted or non-inverted version of the ErrAlert signal 60.

Figure 10:
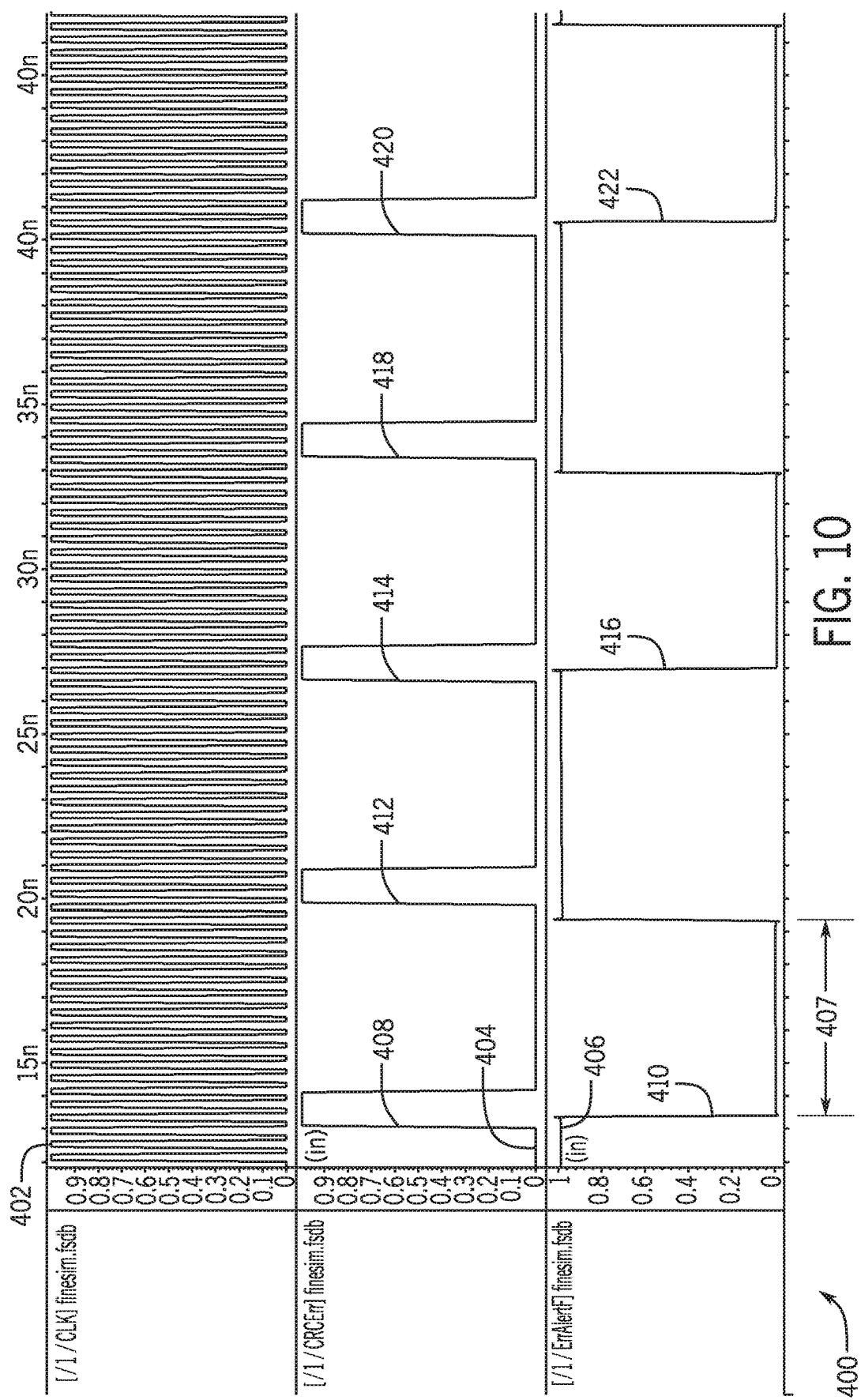
FIG. 10 is a graph showing CRC error detection signals and CRC alert signals using the CRC circuitry of FIG. 6, in accordance with an embodiment of the present disclosure.

FIG. 10 is a graph 400 of CRC detection and alerting using the using the synchronous counter-based CRC circuitry 48 of FIG. 6. The graph 400 includes a line 402 corresponding to the CLK 150. Additionally, the graph 400 includes a line 404 that corresponds to the CRCerr signal 56 indicating when a CRC error has been detected in the CRC detection circuitry 54. The graph 400 further includes a line 406 that corresponds to the ErrAlert signal 60 that is configured to indicate to the host device that the CRC error has been detected.

In the simulation performed to generate the graph 400, the CRCerr signal 56 occurs every x (e.g., 9) cycles of the line 402. In some specifications (e.g., DDR5 specification) for the memory device 10 may set a pulse width 407 to a number (e.g., 9-17) of cycles of the line 402. In the graph 400, a pulse 408 of the CRCerr signal 56 is used to transmit a pulse 410 of the ErrAlert signal 60 having the pulse width 407.

Since the Q0_block signal 235 is still asserted when a pulse 412 of the CRCerr signal 56 is received, the pulse 412 is skipped. However, a pulse 414 of the CRCerr signal 56 is used to transmit a pulse 416 of the ErrAlert signal 60. Similar to the pulse 412, a pulse 418 is skipped while a pulse 420 of the CRCerr signal 56 is used to transmit a pulse 422 of the ErrAlert signal 60. Thus, the graph 400 reflects a consistent and predictable CRC error alerting scheme that skips every other CRC error.

Figure 11:
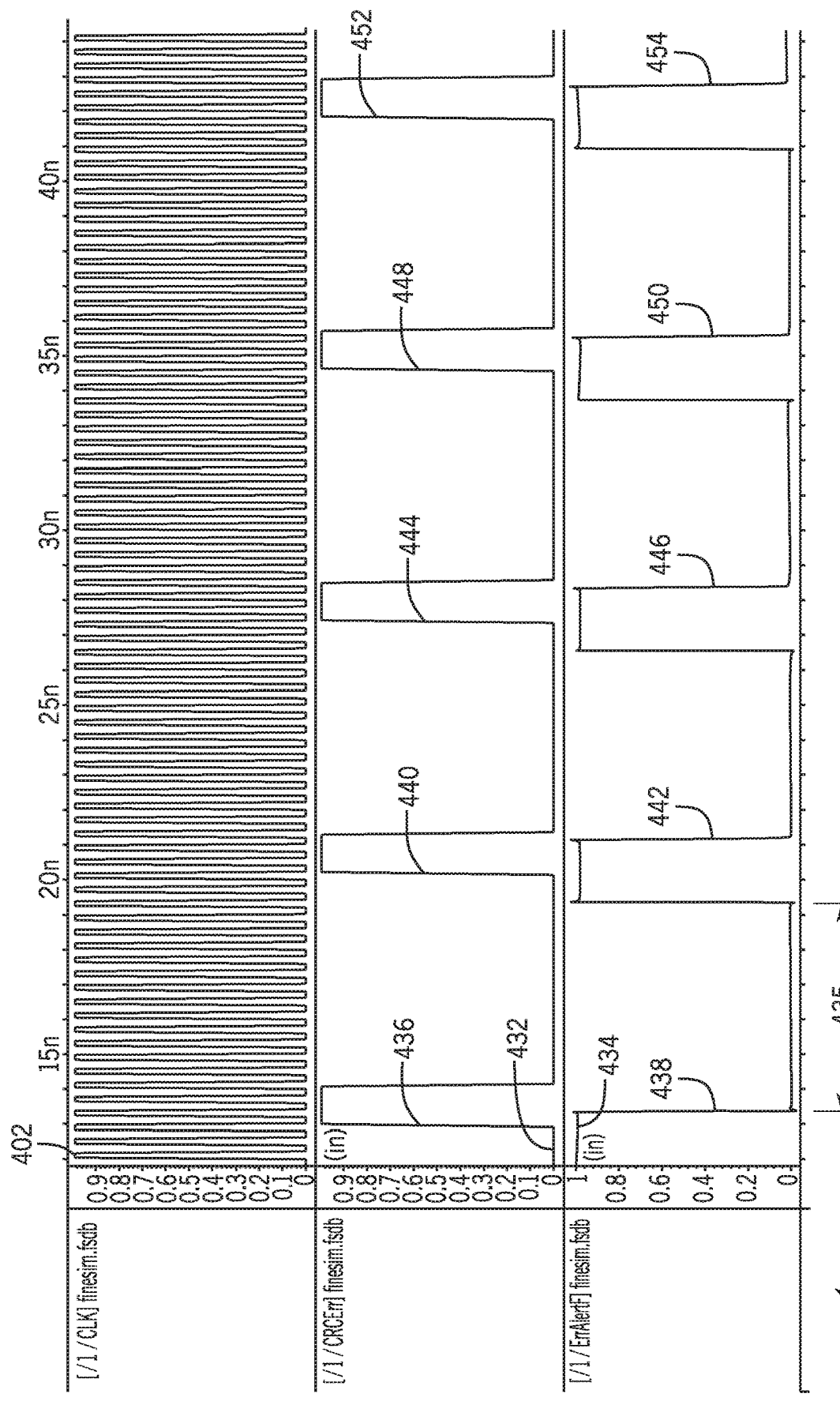
FIG. 11 is a graph showing CRC error detection signals and CRC alert signals using the CRC circuitry of FIG. 6, in accordance with an embodiment of the present disclosure.

FIG. 11 is a graph 430 of CRC detection and alerting using the using the synchronous counter-based CRC circuitry 48 of FIG. 6. The graph 400 includes the line 402 corresponding to the CLK 150. Additionally, the graph 430 includes a line 432 that corresponds to the CRCerr signal 56 indicating when a CRC error has been detected in the CRC detection circuitry 54. The graph 430 further includes a line 434 that corresponds to the ErrAlert signal 60 that is configured to indicate to the host device that the CRC error has been detected.

In the simulation performed to generate the graph 430, the CRCerr signal 56 occurs every y (e.g., 18) cycles of the line 402. In some specifications (e.g., DDR5 specification) for the memory device 10 may set a pulse width 435 to a number of cycles of the line 402. In the graph 430, a pulse 436 of the CRCerr signal 56 is used to transmit a pulse 438 of the ErrAlert signal 60 having the pulse width 435.

A next pulse 440 of the CRCerr signal 56 is used to transmit a pulse 442 of the ErrAlert signal 60; a pulse 444 of the CRCerr signal 56 is used to transmit a pulse 446 of the ErrAlert signal 60; a pulse 448 of the CRCerr signal 56 is used to transmit a pulse 450 of the ErrAlert signal 60; and a pulse 452 of the CRCerr signal 56 is used to transmit a pulse 454 of the ErrAlert signal 60. Thus, the graph 430 reflects a consistent and predictable CRC error alerting scheme that registers every CRC error.

While the foregoing discusses CRC error detection and alerting, in some embodiments, the foregoing concepts may be applied to other error detection schemes. For instance, the foregoing discussion may be applied to parity error detection and alerting circuitry. Additionally or alternatively, in some embodiments, the discussed concepts may be used for any verification error detection and alerting schemes.

Also, although the discussed circuitry includes discussion of signals having logic high or logic low values, some embodiments may include opposite polarities. Additionally, the specific circuitry (e.g., NAND) may be replaced with equivalent circuitry (e.g., inverted inputs to an OR gate) to achieve similar logical results.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A memory device, comprising:
cyclic redundancy check (CRC) circuitry configured to indicate whether an error has been detected in transmission of data from a host device to the memory device, wherein the CRC circuitry comprises:
a synchronous counter that is configured to synchronize a count with a system clock and to transmit the count, wherein the synchronous counter comprises a flip-flop that is configured to
receive a CRC error signal at an input pin of the flip-flop;
receive the system clock at a clock pin of the flip-flop; and
output a local clock from an output of the flip-flop at each pulse of the system clock;

pulse width control circuitry that is configured to receive the synchronized count from the synchronous counter and to generate pulse width controls based at least in part on the synchronized count; and
synchronization circuitry that is configured to receive the pulse width controls and to generate an error alert signal based at least in part on the pulse width controls.

2. The memory device of claim 1, wherein the CRC circuitry comprises CRC detection circuitry that is configured to:
receive the data transmitted from the host device;
receive a checksum from the host device;
detect a CRC error in the data based on the checksum; and
in response to the detected CRC error, transmit the CRC error signal.

3. The memory device of claim 2, wherein the synchronous counter comprises a plurality of flip flops that count pulses of the local clock that is based at least in part on the system clock.

4. The memory device of claim 3, wherein the synchronous counter is configured to receive the CRC error signal from the CRC detection circuitry and to synchronize the CRC error signal to the system clock to generate the local clock.

5. The memory device of claim 4, wherein the synchronous counter comprises a four-bit counter configured to count pulses of the local clock.

6. The memory device of claim 1, wherein the pulse width control circuitry comprises a first plurality of NAND gates that are configured to receive bits from the synchronous counter at the first plurality of NAND gates.

7. The memory device of claim 6, wherein the pulse width control circuitry comprises a first plurality of switches configured to switch between true and complementary versions of the bits.

8. The memory device of claim 6, wherein the pulse width control circuitry comprises a first NOR gate configured to receive outputs from the first plurality of NAND gates.

9. The memory device of claim 8, wherein the pulse width control circuitry comprises a first flip-flop configured to:
receive an output of the first NOR gate at an input of the first flip-flop;
capture the output of the first NOR gate with each pulse of a local clock from the synchronous counter; and
output a CRC error block signal that blocks new CRC errors for a period of time.

10. The memory device of claim 9, wherein the pulse width control circuitry comprises a second plurality of NAND gates that are configured to receive the bits from the synchronous counter at the second plurality of NAND gates.

11. The memory device of claim 10, wherein the pulse width control circuitry comprises a second plurality of switches configured to switch between true and complementary versions of the bits.

12. The memory device of claim 11, wherein the pulse width control circuitry comprises a second NOR gate configured to receive outputs from the second plurality of NAND gates.

13. The memory device of claim 12, wherein the pulse width control circuitry comprises a second flip-flop configured to:
receive an output of the second NOR gate at an input of the second flip-flop;
capture the output of the second NOR gate with each pulse of the local clock; and
output a CRC error alert pulse width signal that controls a width of a CRC error alert pulse.

14. The memory device of claim 13, wherein the period of time is greater than the width of the CRC error alert pulse.

15. Cyclic redundancy check (CRC) circuitry, comprising:
CRC detection circuitry configured to generate a CRC error signal to indicate whether an error has been detected in transmission of data from a host device to a memory device, wherein the CRC circuitry comprises:
a synchronous counter that is configured to synchronize pulses of the CRC error signal with a system clock, generate a local clock based on the pulses of CRC error signal and the system clock, and to transmit bits of a counter of the local clock;
pulse width control circuitry that is configured to receive the bits and local clock from the synchronous counter, and to generate pulse width controls based at least in part on the bits and the local clock, wherein the pulse width control circuitry comprises a first plurality of NAND gates and a first NOR gate configured to receive outputs from the first plurality of NAND gates, wherein the plurality of NAND gates are configured to receive bits from the synchronous counter; and
synchronization circuitry that is configured to receive the pulse width controls and to generate an error alert signal based at least in part on the pulse width controls.

16. The CRC circuitry of claim 15, wherein the synchronization circuitry is configured to synchronize the error alert signal with the system clock.

17. The CRC circuitry of claim 15, wherein the pulse width controls comprise a CRC error alert pulse width signal configured to set a pulse width of the error alert signal and a CRC alert blocking signal configured to block new CRC errors for a period longer than the pulse width of the error alert signal.

18. A method, comprising:
using CRC detection circuitry, detecting CRC errors in data received from a host device;
based on the detection of the CRC errors generate a CRC error signal;
using a synchronous counter to synchronize pulses of the CRC error signal with a system clock to generate a local clock based on the pulses of CRC error signal and the system clock, wherein using the synchronous counter comprises using a flip-flop of the synchronous counter to receive the CRC error signal at an input pin of the flip-flop, receive the system clock at a clock pin of the flip-flop, and output the local clock from an output of the flip-flop at each pulse of the system clock;
using pulse width control circuitry to receive bits of a counter of the local clock and to receive the local clock from the synchronous counter;
using the pulse width control circuitry, generating pulse width controls based at least in part on the bits and the local clock; and
using synchronization circuitry to receive the pulse width controls and to generate an error alert signal based at least in part on the pulse width controls.

19. The method of claim 18, wherein generating the error alert signal comprises synchronizing the error alert signal to the system clock using the flip-flop.

* * * * *